Dec. 1, 1942  R. D. EVANS ET AL  2,303,445
MEANS FOR MINIMIZING TRANSIENT VOLTAGES
Filed July 19, 1940
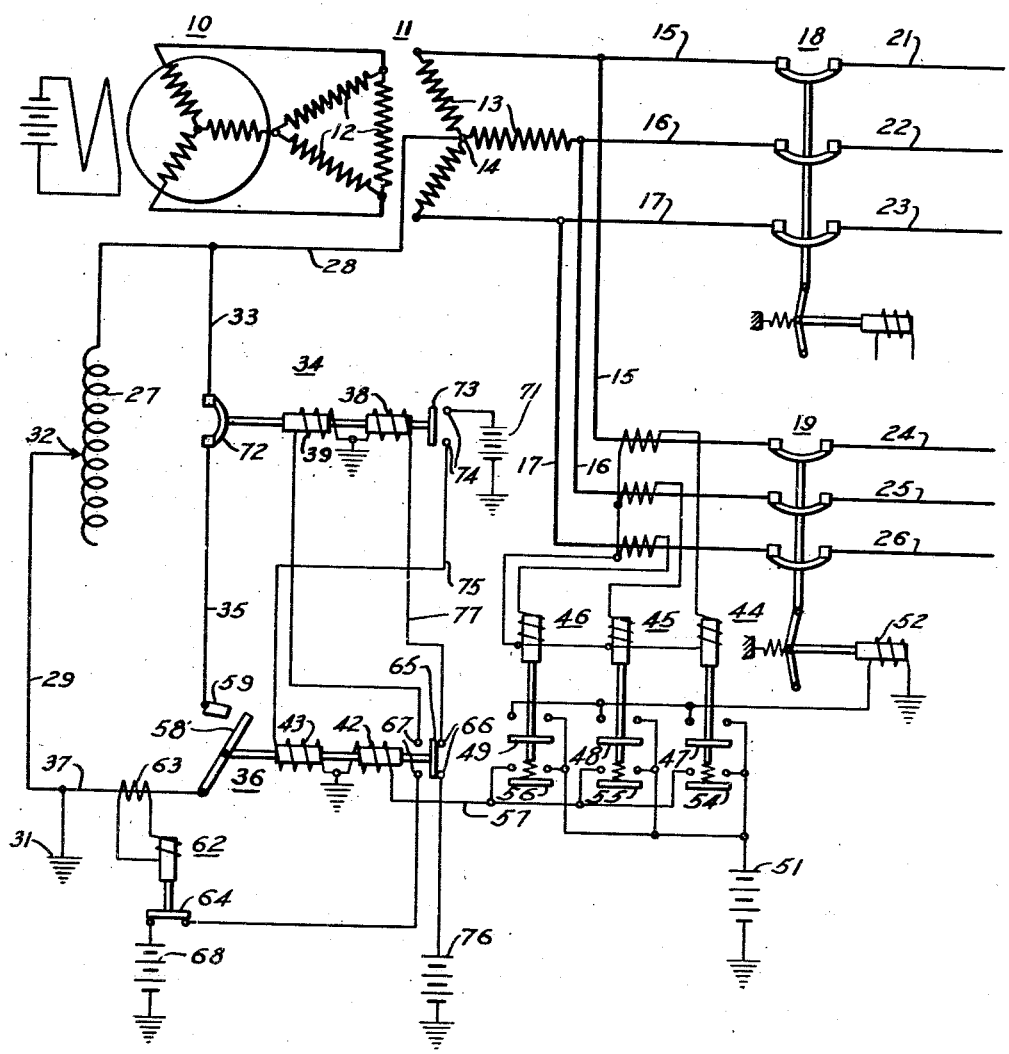
WITNESSES:
INVENTORS
Robert D. Evans and
Alexander C. Monteith.
BY
Franklin E. Hardy
ATTORNEY Patented Dec. 1, 1942

2,303,445

UNITED STATES PATENT OFFICE 2,303,445

MEANS FOR MINIMIZING TRANSIENT VOLTAGES

Robert D. Evans, Swissvale, and Alexander C. Monteith, Wilkinsburg, Pa., assignors to Westinghouse Electric & Manufacturing Company, East Pittsburgh, Pa., a corporation of Pennsylvania Application July 19, 1940, Serial No. 346,312

12 Claims. (Cl. 175—294)

Our invention relates to means for minimizing transient voltages on electric power transmission lines, and has particular application to transmission systems employing ground fault neutralizers such as those tuned to the capacitances-to-ground of the three phases of the alternating-current circuit, commonly called Petersen coils. In such systems, the grounding reactor or Petersen coil, that is connected between the neutral point of the system and ground, is so dimensioned electrically that the reactance of the reactor is so related to the capacitance of the transmission line that upon a single-phase fault to ground on the transmission line, the flow of the ground current through the reactance of the Petersen coil will extinguish the ground fault current.

It has been found that in the case of arcing grounds and switching operations on unfaulted lines, low transient voltages are experienced on transmission systems employing ground fault neutralizing reactors as above indicated.

It has also been found that on the above indicated type of reactor grounded system, abnormal voltages may be produced if switching operations are performed when the system is subjected to a fault. In order to avoid these abnormal voltages upon the equipment, we propose to short circuit the neutral grounding reactor coil and convert the system to a solidly grounded system before the line switches are operated to disconnect the faulted portion of the circuit.

The need for such operation of the system has been established by system studies reported to the American Institute of Electrical Engineering in a paper "Power system transients caused by switching and faults" by Messrs. R. D. Evans, A. C. Monteith and R. L. Witzke. Part II of this paper gives the results of transient studies on a particular transmission system subjected to different fault conditions and a range of grounding conditions for both resistance and reactance between the limits of a solidly grounded system and a free neutral system. From the investigation reported in this paper, it is indicated that transient voltages caused by deenergizing a line of the transmission system with a single or double line-to-ground fault is much higher for Petersen coil grounded systems than for the solidly grounded neutral systems.

Throughout the entire history of the Petersen coil or fault neutralizer operating experience, there have been occasional evidences of important overvoltages. The exact mechanism for producing this overvoltage has not been clearly established. There are a number of ways which are known by which these overvoltages may be produced by a number of unbalanced conditions. Any arrangement which would produce a zero-sequence current of considerable magnitude would give rise to very high voltage due to the fact that the Petersen system is in series resonant for zero-sequence voltages. For example, the opening of one phase of a system subjected to a three-phase or a line-to-line fault on the phase being opened will produce a steady-state voltage of many times normal.

Because of the seriousness of these transient overvoltages, a number of efforts have been made to limit their magnitude. For example, lightning arresters have been connected across the Petersen coil to limit the actual transient overvoltages. Other schemes have included means for destroying the resonant relation either by introducing loss as by some shunt device or by introducing saturation. From a practical point of view, these schemes have been only partially effective. Lightning arresters are of limited value because they are quite expensive if they are designed to carry the fundamental frequency components of power for the duration necessary to prevent the over-voltages. Means for upsetting the resonance by changing the ohmic value of the neutral reactance are quite effective for limiting the magnitude of voltages produced by induced fundamental frequency currents. These arrangements, however, are not very effective for limiting the magnitude of transient voltages produced by switching operations.

The present invention is directed to a method and means for limiting the transient overvoltages arising from switching operations which isolate faulted line sections on a transmission or distribution system employing ground fault neutralizers by reducing the reactance between the neutral 6 and ground of the system to a very low value to limit the transient voltages to a magnitude corresponding to those encountered on a solidly grounded system. The invention is not limited in its application to use with systems employing the tuned reactance necessary for arc suppression by the Petersen method, but is applicable also to systems employing other values of reactance or resistance between the neutral of the system and ground.

More specifically, the present invention is directed to a method and means for preventing high transient overvoltages in a neutral reactor grounded system during switching operations by short-circuiting the ground fault reactors connected between the neutral point of the system and ground before operation of the sectionalizing switches for disconnecting the faulted transmission line or portion thereof from the system, and immediately thereafter removing the short-circuit about the grounding reactor to reestablish the ground fault reactor in the system.

Other objects and advantages of the invention will be apparent from the following description when read with reference to the accompanying drawing, in which the single figure is a diagrammatic view of circuits and apparatus employed in one preferred embodiment of the invention.

Referring to the drawing, a source of alternating-current energy is illustrated comprising an alternating-current generator 10 connected to a transformer 11 having primary windings 12, shown connected in delta, and secondary windings 13 connected in Y, providing a neutral point 14 at the junction of the several phase windings. Three phase circuit conductors 15, 16 and 17 are connected to be supplied with electrical energy from the transformer windings 13, and are connected by sectionalizing switches or circuit breakers 18 and 19 to parallel feeder sections or transmission lines represented by conductors 21, 22, 23 and 24, 25, 26, respectively. The two feeder transmission lines may be parallel circuits leading to a common load source and provided with sectionalizing circuit breakers to disconnect portions thereof from the circuit in accordance with well-known practice, so as to isolate a faulted section from the remainder of the system.

A ground fault neutralizer or reactor coil 27 is provided connected between the neutral point of the system 14 and ground at 31 by conductors 28 and 29. The reactor 27 is shown as provided with a tap switch 32 for adjusting the number of turns of the coil 27 connected in the grounded neutral circuit, so as to adjust the reactance in the circuit to the conditions existing upon the transmission line circuit.

Means for closing a circuit in shunt to the reactor coil 27 is provided including conductor 33, an oil circuit breaker 34, conductor 35, a short-circuiting switch 36 and conductor 37 to ground at 31. In the drawing, the circuit breaker 34 is shown in its circuit closing position, and the short-circuiting switch 36 is shown in its circuit interrupting position, which are the normal positions for these switches under normal transmission line conditions. The circuit breaker 34 is provided with a closing magnet 38 and an opening magnet 39, and the short-circuiting switch 36 is provided with a closing magnet 42 and an opening magnet 43. The control of the circuit breaker and short circuiting switch is governed by the operation of line relays 44, 45 and 46, the operating coils of which are shown connected in circuit with current transformer windings responsive to abnormally high current in the conductors leading to the feeder circuit 24, 25, 26, respectively, which when operated to their upper or circuit closing positions, cause the movable contact members 47, 48 or 49, respectively, to close a circuit from a source of energy represented as a battery 51 through a trip coil 52 on the circuit breaker 19 to cause the circuit breaker to be operated to its circuit interrupting position. It will be appreciated that similar relays are related to the conductors feeding the feeder circuit 21, 22 and 23 through the circuit breaker 18 which are similarly operated to cause the circuit breaker 18 to interrupt the current through its associated feeder circuit upon a fault in any phase of that circuit. The line relays 44, 45, 46 are provided with auxiliary contact members 54, 55 and 56, respectively, which are so positioned with respect to the stem of the relays as to close circuits from the battery 51 through conductor 57 and the trip coil of the closing magnet 42 of the short circuiting switch 36 prior to energization of the trip coil 52 of the circuit breaker 19.

If, for example, faults to ground occur on conductors 24 and 25 of the feeder circuit, currents will flow in these conductors and the relays 44 and 45 will move upwardly and, upon a slight amount of movement, cause a circuit to be closed through the relay contact members 54 and 55, and the operating coil of the closing magnet 42 to operate the blade 58 of the short circuiting switch to a circuit closing position. Upon a predetermined movement of the switch blade 58 into engagement with a cooperating contact member 59, the above traced circuit in shunt to the reactor 27 is completed. A ground relay 62 is provided having a coil energized from a current transformer 63 that is sensitive to the flow of current through the above traced circuit in shunt to the reactor 27, which causes the relay contact member 64 to be moved upwardly to a circuit interrupting position. During movement of the short circuiting switch 36 to its circuit closing position, the back contact member 65 is moved from engagement with the contact members 66, and, after the ground relay 62 has operated as just described, comes into engagement with the contact members 67.

The above described operation of the short circuiting switch 36 takes place prior to a completion of the movement of the relay 44 to close the tripping circuit for the circuit breaker 19 through the contact member 47. Upon completion of this operation, the circuit breaker 19 interrupts the circuit through the feeder represented by conductors 24, 25 and 26 and the fault current through the solidly grounded connection is interrupted so that the ground relay 62 is deenergized and drops to its illustrated position, closing a circuit from a source of energy represented by the battery 68, through contact members 65 and 67 of the short circuiting switch 36 and the coil of the opening magnet 39 of the circuit breaker 34, which, upon energization, operates the contact member 72 of the circuit breaker 34 to a circuit interrupting position, and, at the same time, actuates the back contact member 73 to close a circuit through contact members 74. The opening operation of the circuit breaker 34 completes a circuit from the battery 71, through contact member 73 and 74, through conductor 75, the coil of the opening magnet 43 of the short circuiting switch 36 and through ground to the battery 71 for operating the switch 36 to its illustrated position, in which the contact members 58 and 59 are separated, and the back contact member 65 is in engagement with contact members 66. This operation of the back contact member 65 closes a circuit from the battery 76 through contact members 65 and 66, conductor 77 and the coil of the closing magnet 38 to operate the circuit breaker 34 to its illustrated or circuit closing position, thus completing the cycle of operation of the circuit breaker 34 and short circuiting switch 36 effected upon operation of any of the relays 44, 45 or 46 to their circuit closing position to deenergize a feeder transmission line by operation of the circuit breaker 19.

It will thus be seen that we have provided a system for effecting the solid neutral-to-ground connection of the system upon the operation of any of the relays normally used for controlling the disconnection of a feeder circuit from the transmission line, which ground connection is effected prior to the operation of the segregating circuit breaker, the system providing a sequence of operation of the short circuiting switch and oil circuit breaker to reestablish the normal conditions of these switches after the fault has been cleared, so that the neutral-to-ground connection again includes the Petersen coil and the switches are again ready to operate upon a subsequent energization of any one of the sectionalizing control relays.

In the illustration of the invention just described, it will be appreciated that the sectionalizing control relays 44, 45 and 46 are shown as simple current relays. It should be appreciated that the same sequence of operation of the short circuiting switch and neutral oil circuit breaker, as above described, may be effected and the faulty sections of the transmission line may be disconnected by the use of voltage relays, distance relays, carrier current relays, or any of the conventional relaying systems customarily applied to relay fault conditions on transmission lines. The particular arrangement of the fault relays will depend on the characteristics of a particular system. It may, for example, be necessary to operate the fault responsive relays in response to a fault at a remote point on the system rather than in the line-section adjacent to the point of application of the Petersen coil. It may also be necessary to clear the fault by operation of a circuit breaker remote from the Petersen coil, such as at the receiving or load end of the transmission line represented by conductors 24, 25 and 26, in which case some relaying ararngement known to the art for detecting faults on the system at a remote point may be employed in place of the current relays 44, 45 and 46.

It will also be appreciated that for purposes of illustrating the application of the invention, the grounding reactor is shown at the source end of the transmission line, although such grounding reactors may also be applied at the receiving end of a transmission line, and in the case of very long lines at intermediate points thereof, if found desirable.

The invention in its broad aspects is independent of the particular location of the grounding reactor in the transmission system, or, as above explained, of the particular type of fault responsive relaying system for interrupting the faulted section of the line from the system. The essential feature of the invention is to short circuit the grounding reactor, thus providing a solid neutral-to-ground connection before operation of the sectionalizing or fault-clearing circuit breaker. Grounding reactors may be provided at both ends of a transmission line or of separable sections thereof which are arranged to be isolated from the remainder of the system by operation of line breakers or sectionalizing switches that are controlled by fault responsive relays, and which are also effective to establish a solid neutral-to-ground connection prior to operation of the sectionalizing switches.

Many modifications of the circuits and apparatus illustrated and described, within the spirit of our invention, will occur to those skilled in the art, and we do not wish to be limited otherwise than by the scope of the appended claims.

We claim as our invention:

1. In a system of electrical transmission, the combination with a source of electrical energy having a neutral point, a ground connection leading from said neutral point and including a reactor, a switch for short circuiting said reactor, a transmission line circuit leading from said source, a circuit breaker for disconnecting said transmission line from said source, a control circuit for effecting the operation of said switch to its closed position and a control circuit for effecting operation of said circuit breaker to its circuit opening position, and means operated in response to certain abnormal circuit conditions in said transmission line circuit for at all times governing said two control circuits in sequence to first short-circuit said reactor and then operate said circuit breaker to disconnect said transmission line circuit from said source.

2. In a system of electrical transmission, the combination with a source of electrical energy having a neutral point, a ground connection leading from said neutral point and including a reactor, a transmission line circuit leading from said source, circuit breaker means for disconnecting said transmission line from said source, and means responsive to abnormal circuit conditions in said transmission line circuit for first short circuiting said reactor and then operating said circuit breaker means to disconnect said transmission line from said source, said means for short circuiting said reactor including two electrically operated switches connected in series for closing a circuit in shunt to said reactor, one of said switches being normally in its circuit closing position, and the other of said switches being normally in its circuit interrupting position, and means for controlling the operation of said last-named switch to its circuit closing position in response to the operation of the means responsive to abnormal circuit conditions.

3. In a system of electrical transmission, the combination with a source of electrical energy having a neutral point, a ground connection leading from said neutral point and including a reactor, a plurality of feeder line circuits leading from said source, a circuit breaker associated with each feeder circuit for disconnecting said feeder circuit from said source, a control circuit for effecting the operation of said circuit breaker to its circuit opening position, a short circuiting switch for closing a circuit in shunt relation to said reactor, a control circuit for controlling the operation of said switch to its circuit closing position, and means associated with each feeder circuit and responsive to abnormal feeder circuit conditions in that feeder circuit for controlling the circuit breaker associated with that feeder circuit and the short circuiting switch, said means, when operated, at all times governing said two control circuits in sequence to first short-circuit said reactor and then operate said circuit breaker to disconnect said transmission line from said source.

4. In a system of electrical transmission, the combination with a source of electrical energy having a neutral point, a ground connection leading from said neutral point and including a reactor, a plurality of feeder line circuits leading from said source, a circuit breaker associated with each feeder circuit for disconnecting said feeder circuit from said source, a short circuiting switch for closing a circuit in shunt relation to said reactor, means associated with each feeder circuit and responsive to certain abnormal feeder circuit conditions in that feeder for controlling the circuit breaker associated with that feeder circuit and the short circuiting switch to first short circuit said reactor and then disconnect said feeder circuit from said source, a circuit breaker in series with said short circuiting switch, and means responsive to the closing of said short circuiting switch for controlling the operation of said circuit breaker to interrupt said circuit in shunt relation to said reactor.

5. In a system of electrical transmission, the combination with a source of electrical energy having a neutral point, a ground connection leading from said neutral point and including a reactor, a plurality of feeder line circuits leading from said source, a circuit breaker associated with each feeder circuit for disconnecting said feeder circuit from said source, a short circuiting switch for closing a circuit in shunt relation to said reactor, means associated with each feeder circuit and responsive to certain abnormal feeder circuit conditions in that feeder circuit for controlling the circuit breaker associated with that feeder circuit and the short circuiting switch to first short circuit said reactor and then disconnect said feeder circuit from said source, a normally closed circuit breaker in series with said short circuiting switch, and means for controlling the operation of said circuit breaker for interrupting the circuit in shunt relation to said reactor including a back contact on said short circuiting switch and a ground relay responsive to current flow in said shunt circuit.

6. In a system of electrical transmission, the combination with a source of electrical energy having a neutral point, a ground connection leading from said neutral point and including a reactor, a plurality of feeder line circuits leading from said source, a circuit breaker associated with each feeder circuit for disconnecting said feeder circuit from said source, a short circuiting switch for closing a circuit in shunt relation to said reactor, means associated with each feeder circuit and responsive to certain abnormal feeder circuit conditions in that feeder circuit for controlling the circuit breaker associated with that feeder circuit and the short circuiting switch to first short circuit said reactor and then disconnect said feeder circuit from said source, a normally closed circuit breaker in series with said short circuiting switch, means for controlling the operation of said circuit breaker for interrupting the circuit in shunt relation to said reactor including a back contact on said short circuiting switch and a ground relay responsive to current flow in said shunt circuit, and means responsive to the opening of said short circuiting switch for effecting the reclosing of the circuit breaker included in said shunt circuit.

7. In a polyphase system of alternating-current electrical transmission, the combination with a polyphase source of electrical energy having a neutral point, a ground connection leading from said neutral point and including a reactor, a transmission line circuit comprising a plurality of line sections leading from said source, circuit breaker means for isolating said sections from the system, circuit breaker means for short circuiting said reactor and means sensitive to the current in said transmission line circuit and responsive to a line-to-ground fault on any two of the phases of said transmission line circuit for first operating the circuit breaker for short-circuiting said reactor and then operating said circuit breaker to disconnect said transmission line from said source.

8. In a polyphase system of alternating-current electrical transmission having a neutral point, a ground connection leading from said neutral point and including a reactor, a polyphase source of electric energy, a transmission line circuit leading from said source, a circuit breaker for short circuiting said reactor, circuit breaker means for disconnecting selected sections of said transmission line from said source, and a plurality of means each responsive to abnormal circuit conditions in the separate phases of the separate sections of said transmission line circuit for first operating the circuit breaker for short-circuiting said reactor and then operating said circuit breaker means to isolate the selected section of said transmission line from said source, said means for short circuiting said reactor including two electrically operated switches in series circuit relation for closing a circuit in shunt to said reactor, one of said switches being normally in its circuit closing position, and the other of said switches being normally in its circuit interrupting position, and means for controlling the operation of said last-named switch to its circuit closing position in response to the operation of any one of said plurality of means each responsive to abnormal circuit conditions.

9. In a polyphase system of electrical transmission having a neutral point and including a plurality of parallel connected feeder line circuits, a ground connection leading from said neutral point and including a reactor, a circuit breaker associated with each feeder circuit for interrupting a connection between said feeder circuits, a short circuiting switch for closing a circuit in shunt relation to said reactor, means associated with each feeder circuit and responsive to certain abnormal feeder circuit conditions in that feeder for controlling the circuit breaker associated with that feeder circuit and the short circuiting switch to first short circuit said reactor and then disconnect said feeder circuit from said source, a circuit breaker in series with said short circuiting switch, and means responsive to the closing of said short circuiting switch for controlling the operation of said circuit breaker to interrupt said circuit in shunt relation to said resistor.

10. In a polyphase system of electrical transmission having a neutral point and including a plurality of parallel connected feeder line circuits, a ground connection leading from said neutral point and including a reactor, a circuit breaker associated with each feeder circuit for interrupting a connection between said feeder circuits, a short circuiting switch for closing a circuit in shunt relation to said reactor, means associated with each feeder circuit and responsive to certain abnormal feeder circuit conditions in that feeder circuit for controlling the circuit breaker associated with that feeder circuit and the short circuiting switch to first short circuit said reactor and then disconnect said feeder circuit from said source, a normally closed circuit breaker in series with said short circuiting switch, and means for controlling the operation of said circuit breaker for interrupting the circuit in shunt relation to said reactor including a back contact on said short circuiting switch and a ground relay responsive to current flow in said shunt circuit.

11. In a polyphase system of electrical transmission having a neutral point and including a plurality of feeder line sections, a ground connection leading from said neutral point and including a reactor, circuit breaker means associated with each feeder section for isolating said feeder section from the system, a short-circuiting switch for closing a circuit in shunt relation to said reactor, means associated with each feeder circuit and responsive to certain fault conditions in that feeder section for controlling the circuit breaker associated with that feeder circuit and the short-circuiting switch to first short-circuit said reactor and then isolate said feeder section from said system at a definite interval after the occurrence of the fault, a normally closed circuit breaker in series with said short-circuiting switch, means for controlling the operation of said circuit breaker for interrupting the circuit in shunt relation to said reactor including a back contact on said short-circuiting switch and a ground relay responsive to current flow in said shunt circuit, and means responsive to the opening of said short-circuiting switch for effecting the reclosing of the circuit breaker included in said shunt circuit at a predetermined time after the feeder section has been isolated.

12. In a system of electrical transmission having a neutral point, a ground connection leading from said neutral point and including a reactor, a transmission line circuit leading from said source, circuit breaker means for isolating selected sections of said transmission line from said system, and means for preventing transient voltages on the system caused by operation of said circuit breaker means comprising control means for controlling the operation of said circuit breaker and means also governed thereby for short-circuiting said reactor and then operating said circuit breaker to isolate said transmission line from said system, said means for short-circuiting said reactor including two electrically operated switches in series circuit relation for closing a circuit in shunt to said reactor, one of said switches being normally in its circuit closing position, and the other of said switches being normally in its circuit interrupting position, means for controlling the operation of said last-named switch to its circuit closing position in response to the operation of said means for controlling the operation of said circuit breaker means.

ROBERT D. EVANS.
ALEXANDER C. MONTEITH.